Oct. 17, 1933.  G. H. CLARK  1,930,642
SAW WELDING CLAMP
Filed Nov. 6, 1928  2 Sheets-Sheet 2

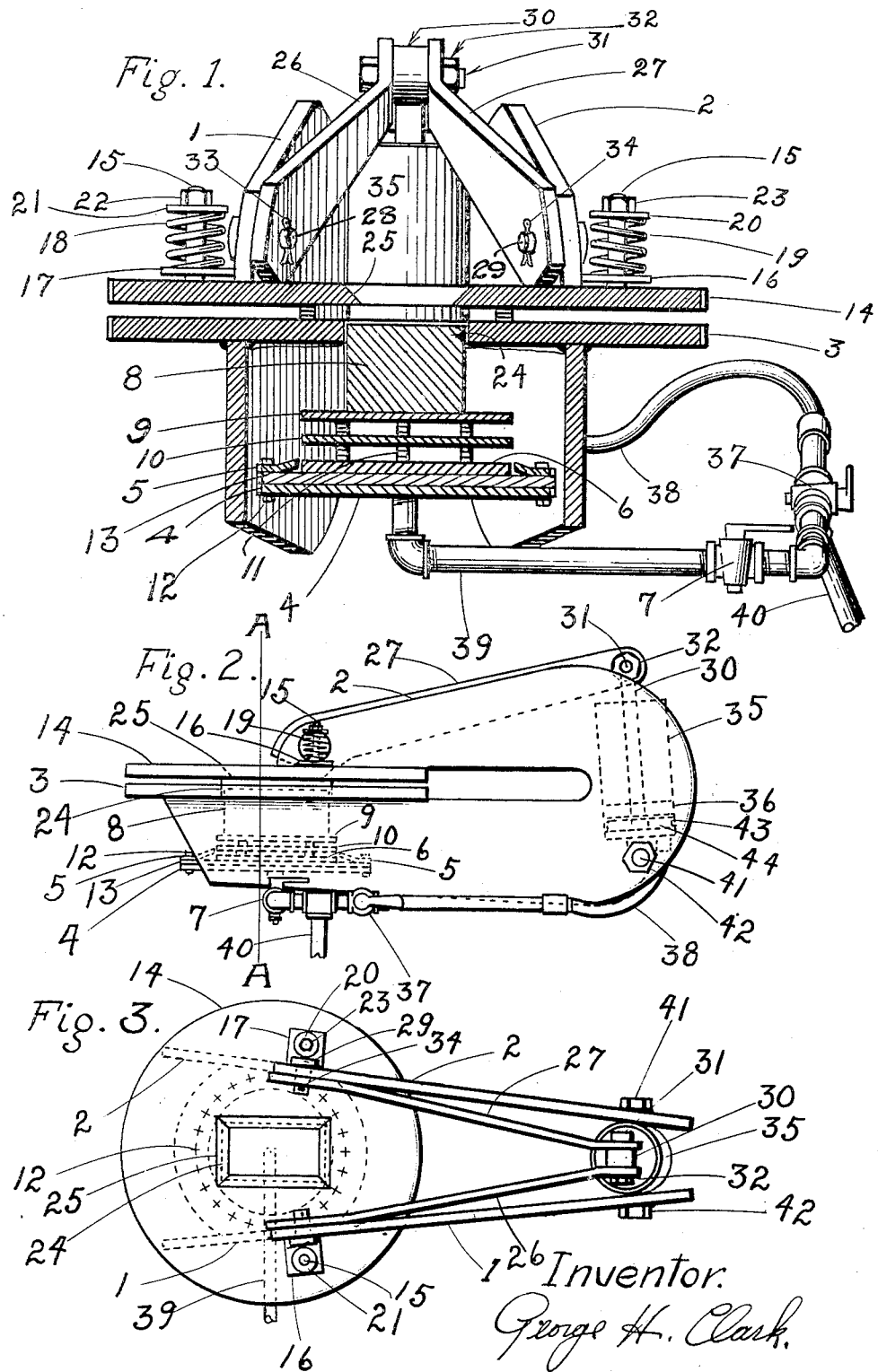

Inventor.
George H. Clark.

Patented Oct. 17, 1933

1,930,642

UNITED STATES PATENT OFFICE 1,930,642

SAW WELDING CLAMP

George H. Clark, Bend, Oreg., assignor to Air Reduction Company, Incorporated, New York, N. Y., a corporation of New York Application November 6, 1928. Serial No. 317,521

3 Claims. (Cl. 78—82)

The invention is an apparatus for the welding of saws in which high temperatures are used for the purpose of fusing the steel at the point of fracture or where a joining together of the steel is desired by fusion. The objects of the improvement are first, to provide a means of holding the saw straight while subjected to the welding heat, thereby reducing the amount of stretching necessary to straighten the saw after the welding is completed.

Second, to provide an anvil for hammering the saw which anvil is so arranged that it may be brought into contact with the lower side of the saw very readily when it is desired to hammer the saw while the same is hot, thereby providing a means of expanding the saw plate while it is hot, in addition to which the hammering may be continued as the saw cools to prevent strains or fractures of the metal due to contraction of the metal while cooling.

Third, to provide a means of forging or working the hot metal at intervals when the saw is being welded, to improve the grain structure of the metal without dishing or buckling the saw plate.

Fourth, to provide a clamp with flat plates of a heat conducting material of sufficient area and volume so that the heat radiating from the saw plate at the point where the weld is being made will be absorbed by the plates, thus assisting the welding operator in preventing overheating of the metal at the point of welding and reducing the tendency of the saw plate to buckle or assume a shape other than a straight surface.

The general object of the invention is to provide a self-contained clamp and adjustable anvil device for the fusion welding of saws, as by the use of the oxyacetylene flame, and for the forging of the metal, with which apparatus this work can be performed expeditiously in a manner that makes it readily possible to obtain excellent and reliable results in the repair or joining of saws.

One form of the invention is illustrated in the accompanying drawings.

Figure 1 is a cross sectional view of the machine on the line A. A. in Figure 2.

Figure 2 is a side elevation of the machine.

Figure 3 is a plan view of the top of the machine.

Figure 4:
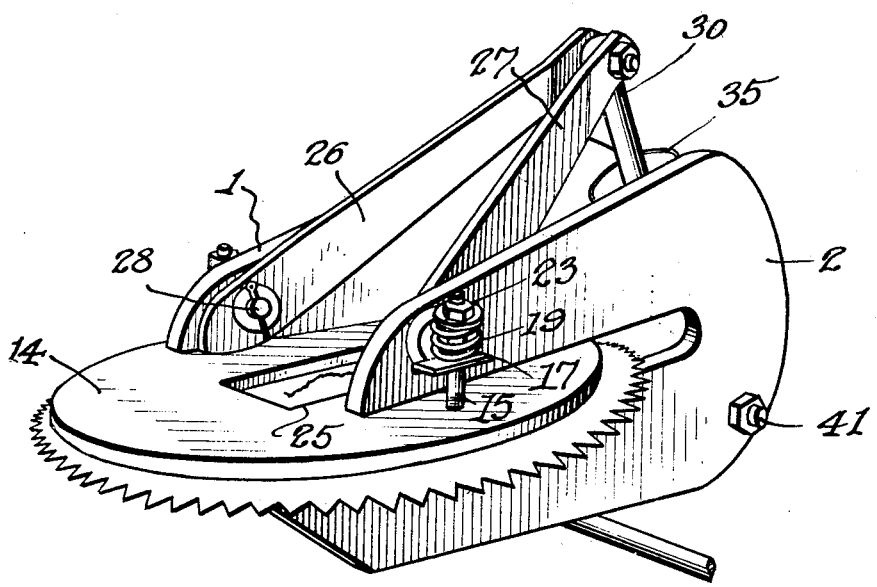
Figure 4 is a view in perspective of the sides or jaws, forming the side frames of the machine, the pressure arms or levers attached to the piston rod of the air cylinder and the upper pressure plate with a saw in position for welding, in the clamp.

The side members 1 and 2, in the present case are electric welded to the lower side of the plate 3 and constitute the frame of the machine. The plate 4, is cut on a taper to fit between the side members 1 and 2, and is also welded to the side members 1 and 2, at its straight sides adjacent thereto, so that plate 4 is rigidly supported to resist the pressure applied to the diaphragm 13, which is of a rubber and cotton cord composition of sufficient strength to resist the air pressure applied to the lower side of diaphragm 13, by means of which the anvil 8 is brought forcibly into contact with the lower side of the saw, when it is to be hammered.

Diaphragm 13, is attached to plate 4, by means of bolts 12, passing through plate 4, diaphragm 13, and ring 5, said bolts being arranged in a circular form as shown in Figure 3, at twelve, (12). Ring 5, is formed of flat steel in the shape of a washer, having a circular shaped opening in the center of sufficient size to allow the plate 6, to pass through freely when it is desired to raise the anvil 8. The inner edge of ring 5, is dished upward to allow for the upward action of the diaphragm 13. 9, and 10, are disks of steel held apart by steel blocks 11, to provide an air space to assist in preventing the heat of the anvil 8 from burning the diaphragm 13.

The circular shaped plate 14, is supported by means of the studs 15, tapped into plate 14, which studs 15, pass through a hole in the brackets 16, and 17, which are electric welded to the outer sides of the frame 1, and 2, said brackets supporting coiled springs 18, and 19, compressed below washers 20, and 21, which are held down by the nuts 22, and 23, the upward thrust of the coil springs 18, and 19, holding the plate 14, suspended above plate 3, to allow the saw to be placed in and removed from the clamp when desired.

The plate 3, has a hole 24, cut in the center to conform to the shape of the anvil 8, and slightly larger than the same to allow free movement of anvil 8, which in the present case is of rectangular form, of face hardened steel.

The top plate 14, referred to as the pressure plate is located directly above, having its center lines above the corresponding center lines of plate 3. Plate 14, has a hole 25, of rectangular form smaller than the hole 24, in plate 3. When the plate 14, is pressed downward gripping the saw, the smaller size of the hole in plate 14, compared to hole 24, in plate 3, allows the edges of hole 25, to overlap the hole 24, in plate 3, thereby forming a stop for the anvil 8, when the same is forced against the lower side of the saw, preventing a tendency to shear the saw at the edge of the anvil 8.

The openings in the plates leave a restricted width or area of the saw blade to be worked upon, this area not being itself clamped, but being kept from bulging and buckling by the closeness of the clamping and heat-absorbing parts to the region of heating and hammering. The apparatus is unobstructed over the working region, so that the torch flame or other thermal agency which fuses the metal can be applied and so that the portion of the saw blades between the adjacent clamp portions can be hammered for the purposes which have been described.

The range of relative movement between the anvil and the clamp may be, and preferably is, rather small. During actual welding or fusing, the anvil should clear the bottom side of the saw sufficiently not to retard the welding, but if it is then fairly close to the saw the anvil will be made hot enough to prevent chilling of the saw during forging of the weld or of the steel surrounding the weld.

The bars 26, and 27 are of steel, shaped substantially as shown in Figure 1, Figure 2, and Figure 3, having a hole at the lower end to fit on the pins 28, and 29, secured by cotter pins 33, and 34, also having a hole at the upper end to attach to the piston 30 by means of bolt 31, secured by nut 32. 35 is an air cylinder provided with a piston 30, piston head 36, and cupped leather 43, and pressure plate inside leather 43, plate 44, as shown in Fig. 2.

By means of air cylinder 35, the gripping action is applied to the saw through the bars 26, and 27. By opening the air valve 37, admitting air to the cylinder 35, through the hose 38, attached to the lower end of cylinder 35, the piston 30, is forced upward causing the bars 26, and 27, to pivot on pins 28, and 29, thus forcing the disk 14, down into contact with the saw.

The air for the operation of the cylinder 35, and the anvil 8, is supplied to a T (pipe fitting) located between valve 7, and valve 37, by the feed line 40.

The valves 7, and 37, are provided with a bleeder opening located so that the piston 30, and the anvil 8, will return to the released position when the valves 7, and 37, are closed against the air supply.

The air cylinder 35, is mounted between side plates 1 and 2, by means of a sleeve centrally located attached to the bottom of the cylinder 35, through which the bolt 41, passes, the bolt also passing through plates 1 and 2 and being secured by the nut 42, providing a means whereby the cylinder 35 adjusts itself to its changing positions when the cylinder is operated.

With apparatus embodying this invention saws can be successfully joined or repaired by welding from one side only (the upper side), complete penetration being obtained without the cumbersomeness and delay of repeatedly turning the saw over to weld short sections of the joint or repair, first from one side and then from the other. The association of the anvil in direct combination with the clamp, and the means for readily raising and lowering one of these, enable the weld to be hammered at intervals or as often as necessary, while the metal is at the right temperature, in order to improve the grain structure of the weld metal, and also enable the area of the saw plate around and including the weld to be hammered to relieve strains, and these operations are made very convenient. Saws can be welded and forged in this manner without, or with the least amount of, buckling, bulging or warping, and without danger of burning the metal.

I am aware that prior to my invention saw welding has been done, I therefore do not claim saw welding broadly; but I claim:

1. An apparatus for the welding of saws by the use of high temperatures to fuse the steel at the region of fracture or joining, and for the forging of the metal, comprising a rigid frame having a top with even supporting surfaces in which is an opening, and a movable upper part to hold the saw plate in severe rigidity with the supporting surfaces, said upper part having an opening for exposing a restricted area of the saw to the welding flame and to hammering, means for clamping said frame and upper part against the saw plate to hold the saw plate in proximity to the region of welding and hammering, in combination with an anvil supported in the frame for vertical movement, means for raising and lowering the anvil and for sustaining it in contact with the saw under hammering, and means positively limiting the upward movement of the anvil to a position in which it is level with said supporting surfaces.

2. An apparatus with which to effect the joining or repair of saws by fusing the steel, and to enable the metal to be hammered, comprising in combination a clamp, an anvil in the clamp, the clamp being constructed with an opening and a clamping area around the opening to hold the saw plate rigidly at regions defining an intervening area of the saw which is to be exposed at the upper side for the application of a high temperature flame or the like and for hammering, means for causing relative movement between the clamp and the anvil to separate the anvil and the under side of the exposed portion of the saw while the welding is being done, and to bring the anvil and the under side of the saw plate in contact when the metal is to be hammered, and means for positively limiting the relative movement which brings the saw plate and the anvil in contact, so as to prevent any tendency of the anvil forcing the working area of the saw blade beyond the clamping level.

3. An apparatus for the welding of saws by the use of high temperatures to fuse the steel at the region of fracture or joining, and for the forging of the metal, comprising a rigid frame having a top with even supporting surfaces in which is an opening, and a movable upper part to hold the saw plate in severe rigidity with the supporting surfaces, said upper part having an opening for exposing a restricted area of the saw to the welding flame and to hammering, means for clamping said frame and upper part against the saw plate to hold the saw plate in proximity to the region of welding and hammering, in combination with an anvil supported in the frame for vertical movement, and means for raising and lowering the anvil and for sustaining it in contact with the saw under hammering, said upper part extending inward over the anvil so as to serve as a positive stop limiting upward movement of the anvil at a position which insures that the exposed area of the saw will be supported in a true plane.

GEORGE H. CLARK.